(12) United States Patent
Chuang

(10) Patent No.: US 11,652,354 B2
(45) Date of Patent: May 16, 2023

(54) CHARGING DEVICE

(71) Applicant: PEGATRON CORPORATION, Taipei (TW)

(72) Inventor: Wen-Chang Chuang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 261 days.

(21) Appl. No.: 17/225,803

(22) Filed: Apr. 8, 2021

(65) Prior Publication Data

US 2021/0376632 A1    Dec. 2, 2021

(30) Foreign Application Priority Data

May 27, 2020  (TW) .................................. 109117646

(51) Int. Cl.
*H02J 7/00*    (2006.01)

(52) U.S. Cl.
CPC .................................. *H02J 7/0042* (2013.01)

(58) Field of Classification Search
CPC ...... H02J 7/0044; H02J 7/0042; H02J 7/0045; G05D 1/0242
See application file for complete search history.

(56) References Cited

U.S. PATENT DOCUMENTS

| 11,121,567 B2 * | 9/2021 | Ebrahimi Afrouzi ....................... H01M 10/44 |
| 11,214,162 B2 * | 1/2022 | Liu ....................... H01R 13/629 |
| 2012/0143428 A1 * | 6/2012 | Kim ..................... G05D 1/0242 701/23 |

FOREIGN PATENT DOCUMENTS

CN    201411051    2/2010

* cited by examiner

*Primary Examiner* — Richard Isla
*Assistant Examiner* — Sadia Kousar
(74) *Attorney, Agent, or Firm* — J.C. Patents

(57) ABSTRACT

A charging device adapted to charge an automatic moving device includes a case, an electricity supply end, a baffle, an arm below the baffle, a blocking assembly on the arm, and a follower. The automatic moving device includes a driving part and an electricity reception end. The case has an opening. The baffle is pivotally connected to the case to cover or expose the opening. The arm has a fixed end and a free end. The blocking assembly is located at an inner side near the opening and movably located on a rotating path of the baffle. The follower is disposed on the free end. When the driving part approaches the opening, the follower moves away from the driving part to drive the blocking assembly to leave the rotating path. The automatic moving device pushes away the baffle, so that the electricity reception end docks with the electricity supply end.

10 Claims, 7 Drawing Sheets

CHARGING DEVICE

CROSS-REFERENCE TO RELATED APPLICATION

This application claims the priority benefit of Taiwan application no. 109117646, filed on May 27, 2020. The entirety of the above-mentioned patent application is hereby incorporated by reference and made a part of this specification.

BACKGROUND

Technical Field

The disclosure relates to a charging device, and particularly relates to a charging device associated with an automatic moving device.

Description of Related Art

In general, an automatic moving device is recharged by a collaborative charging device. The charging device usually has an opening, and a component that covers the opening is configured at the opening to protect the internal structure. The automatic moving device may automatically move to the opening and push away the protective component configured at the opening to dock with the charging device for charging.

However, if the conventional protective component configured at the opening of the charging device may be easily pushed away by any object, internal components of the charging device, e.g., an electricity supply end, may not receive sufficient protection, and dust and other foreign objects may accordingly enter the charging device. What is worse, the internal structure of the charging device may even be damaged.

SUMMARY

The disclosure provides a charging device which has a blocking assembly disposed at an inner side near an opening of a case to prevent a baffle disposed at the opening from being easily pushed away by an object.

In an embodiment of the disclosure, a charging device is adapted to charge an automatic moving device. The automatic moving device includes a driving part and an electricity reception end. The charging device includes a case, an electricity supply end, a baffle, an arm, a blocking assembly, and a follower. The case has an opening, and the case is divided into an inner side and an outer side by the opening. The electricity supply end is disposed in the case. The baffle is pivotally connected to the case to cover or expose the opening. The arm is located at one side of the baffle opposite to the other side pivotally connected to the case and has a fixed end and a free end opposite to each other. The fixed end is fixed to the case and located at the inner side, and the free end extends from the fixed end to the outer side. The blocking assembly is disposed at the arm, wherein the blocking assembly is located at the inner side near the opening and is movably located on a rotating path of the baffle. The follower is disposed at the free end of the arm, and the follower is adapted to be forced to move away from the driving part of the automatic moving device when the driving part approaches the opening of the charging device, so that the free end is shifted together with the follower and drives the blocking assembly disposed at the arm to move away from the rotating path of the baffle. The automatic moving device is adapted to push away the baffle to enter the case, so that the electricity reception end docks with the electricity supply end.

In an embodiment of the disclosure, the driving part includes a first magnetic member, the follower includes a second magnetic member adapted to correspond to the first magnetic member, and magnetic properties of the first magnetic member and the second magnetic member are the same.

In an embodiment of the disclosure, the arm includes a groove at the free end, and the second magnetic member is in the groove.

In an embodiment of the disclosure, the case includes a position-limiting board covering the second magnetic member and located at the outer side. When the automatic moving device has not yet approached the charging device, the baffle is limited to be located between the blocking assembly and the position-limiting board.

In an embodiment of the disclosure, the follower includes a bump protruding from the case and located at the outer side, and the driving part of the automatic moving device is a casing. When the driving part of the automatic moving device approaches the opening of the charging device, the driving part pushes against the follower, so that the follower is forced to move away from the driving part.

In an embodiment of the disclosure, when the automatic moving device has not yet approached the charging device, a height of the bump is greater than a height of a bottom of the baffle, so that the baffle is limited to be located between the blocking assembly and the bump.

In an embodiment of the disclosure, the blocking assembly includes a stopper, and the stopper has a blocking surface facing the opening and an inclined surface facing the electricity supply end. When the automatic moving device has not yet approached the charging device, the baffle covers the opening, and the blocking surface faces the baffle; when the automatic moving device retracts from the opening, in a process during which the baffle returns to cover the opening, the baffle pushes against the inclined surface until the stopper moves away from the rotating path of the baffle, so that the baffle returns to where the baffle covers the opening.

In an embodiment of the disclosure, the blocking assembly further includes an elastic member located below the stopper. When the baffle pushes against the inclined surface, the elastic member is deformed, so that the stopper moves away from the rotating path of the baffle.

In an embodiment of the disclosure, the blocking assembly further includes a base fixed to the arm, and the elastic member is located between the base and the stopper.

In an embodiment of the disclosure, the blocking assembly and the arm are integrally formed.

In view the above, the baffle of the charging device provided in one or more embodiments of the disclosure is pivotally connected to the case to protect the electricity supply end inside the case. Besides, the blocking assembly is disposed at the arm, wherein the blocking assembly is located at the inner side and is located on the rotating path of the baffle. The free end of the arm extends to the outer side, and the follower is disposed at the free end of the arm. Through the above configuration, the follower is adapted to be forced to move away from the driving part of the automatic moving device when the driving part approaches the opening of the charging device, so that the free end is shifted together with the follower and drives the blocking assembly disposed at the arm to move away from the rotating path of the baffle. The automatic moving device is adapted to push away the baffle to enter the case, so that the electricity reception end docks with the electricity supply end. Thereby, the charging device may be better protected, foreign objects may be prevented from entering the charging device, thus preventing damages to the internal structure.

Several exemplary embodiments accompanied with figures are described in detail below to further describe the disclosure in details.

BRIEF DESCRIPTION OF THE DRAWINGS

Reference will now be made in detail to the embodiments of the disclosure, examples of which are illustrated in the accompanying drawings. Wherever possible, the same reference numbers are used in the drawings and the description to refer to the same or like parts.

DESCRIPTION OF THE EMBODIMENTS

Figure 1:
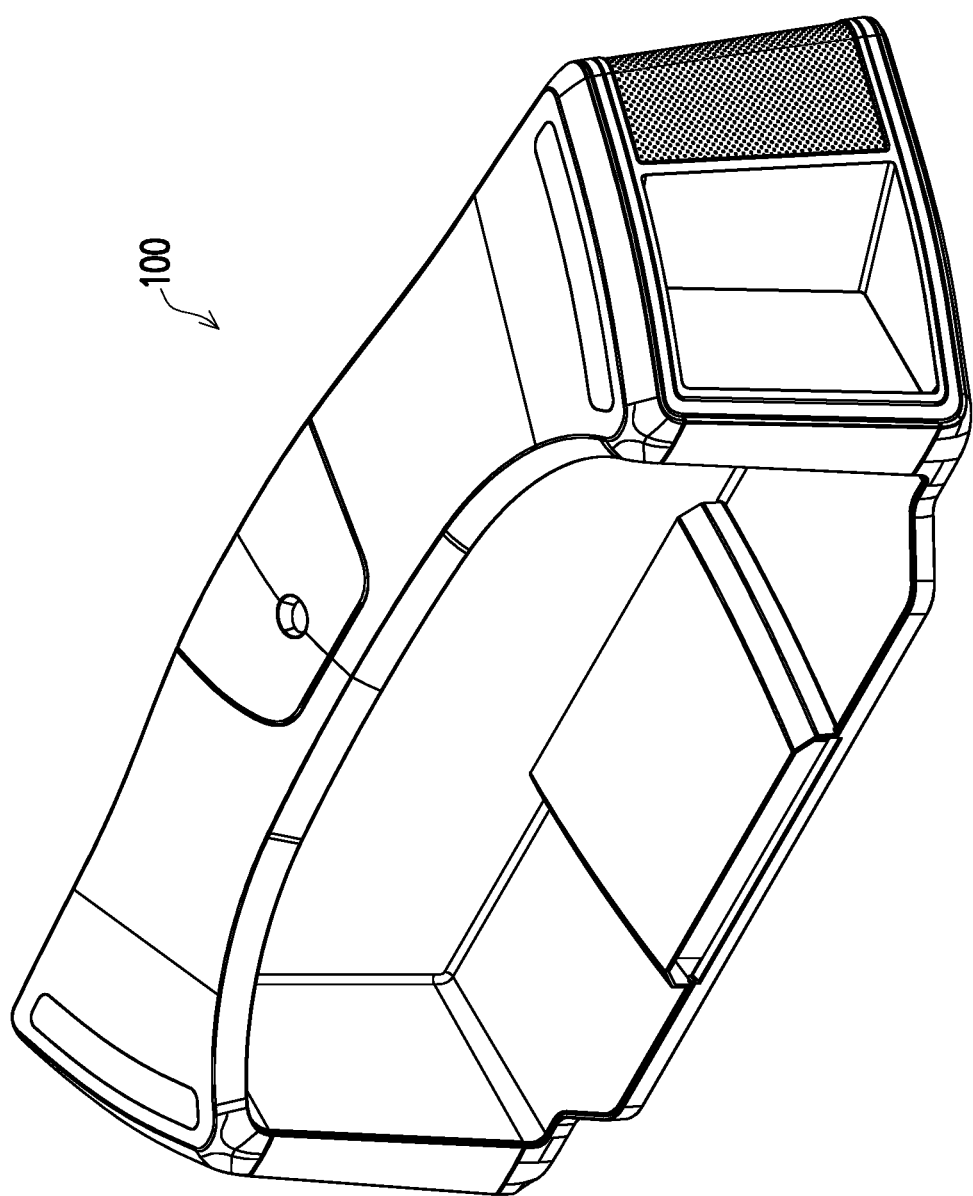
FIG. 1 is a schematic three-dimensional view of a charging device according to an embodiment of the disclosure.
Figure 2:
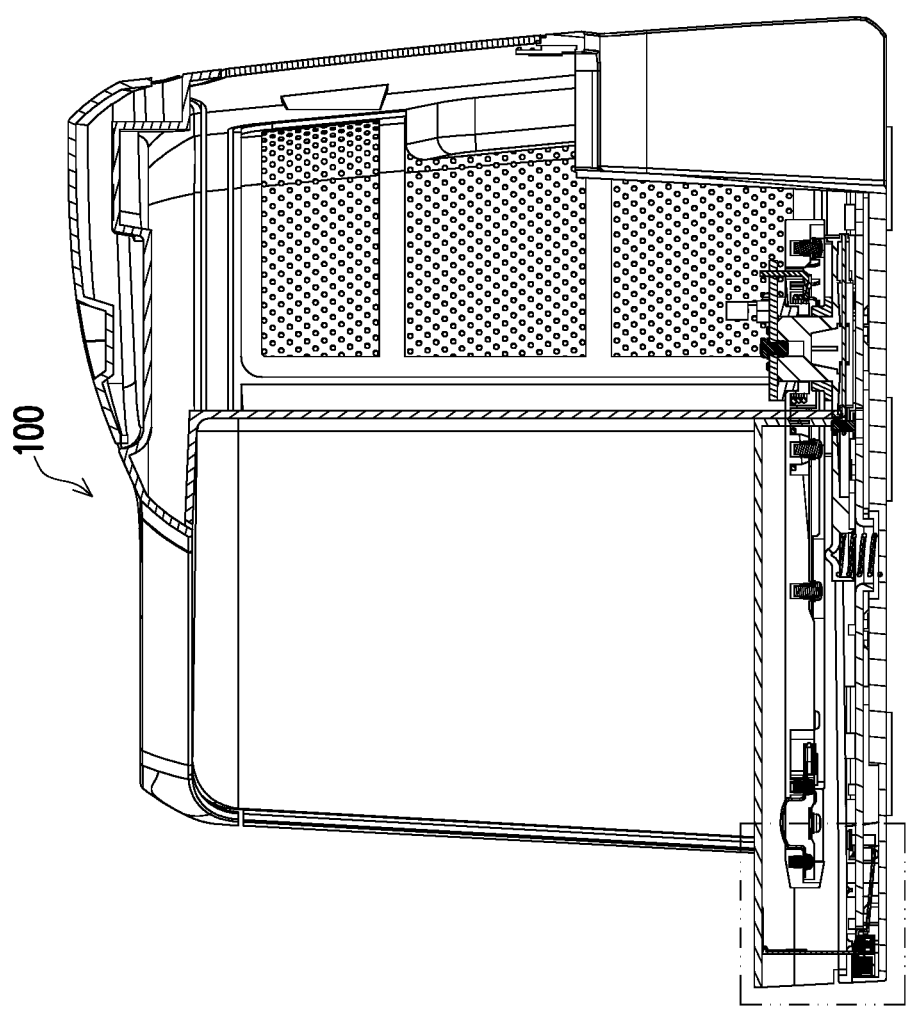
FIG. 2 is a schematic side cross-sectional view of the charging device depicted in FIG. 1.

FIG. 1 is a schematic three-dimensional view of a charging device according to an embodiment of the disclosure. FIG. 2 is a schematic side cross-sectional view of the charging device depicted in FIG. 1. With reference to FIG. 1 and FIG. 2, a base frame of a charging device 100 provided in the embodiment may charge an automatic moving device 200 (shown in FIG. 3A). Here, the automatic moving device 200 is, for instance, a heavy-current robot, but the type of the automatic moving device 200 is not limited in the disclosure.

Figure 3A:
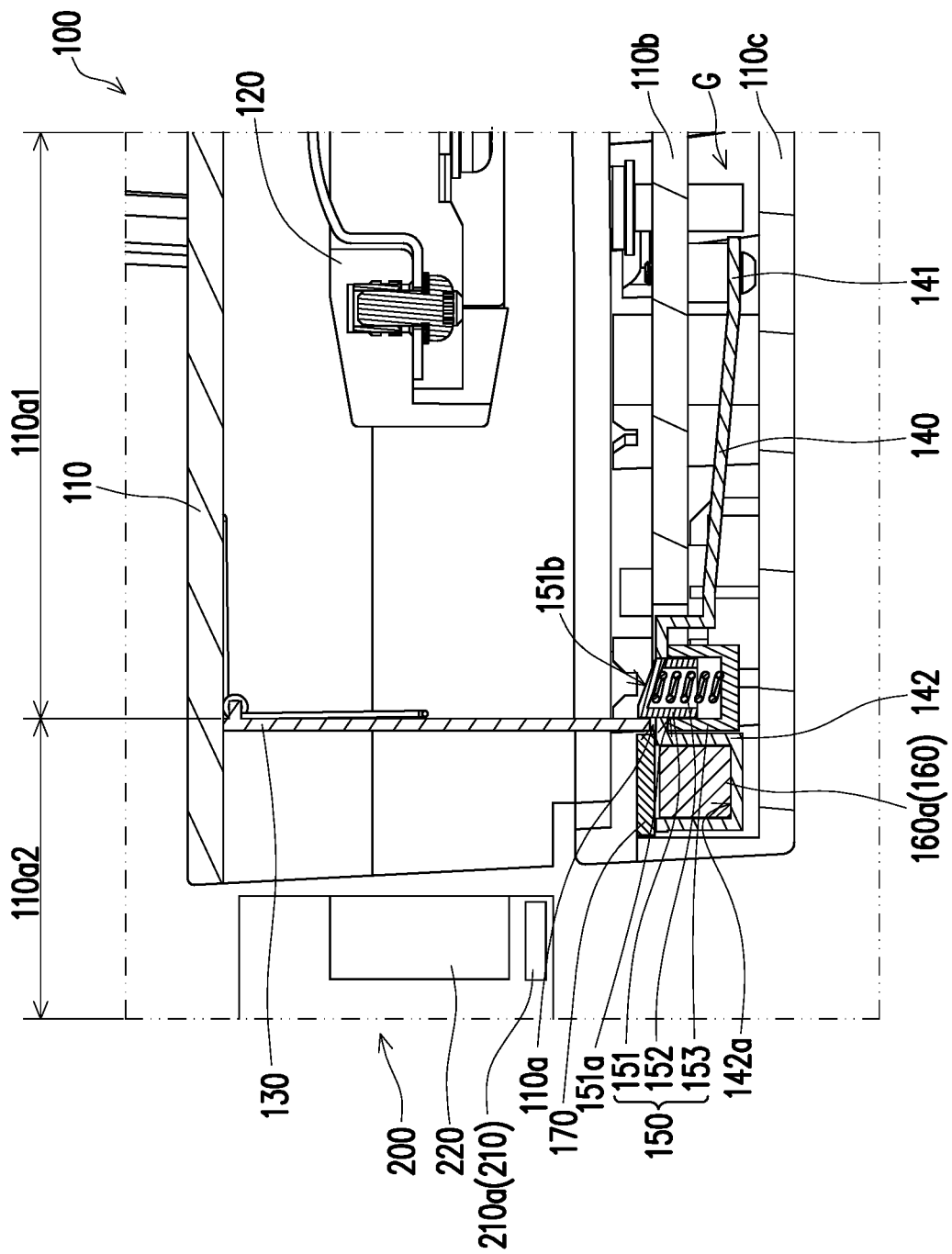
FIG. 3A is a schematic partial enlarged view illustrating that an automatic moving device has not yet approached an opening of the charging device depicted in FIG. 1.
Figure 3B:
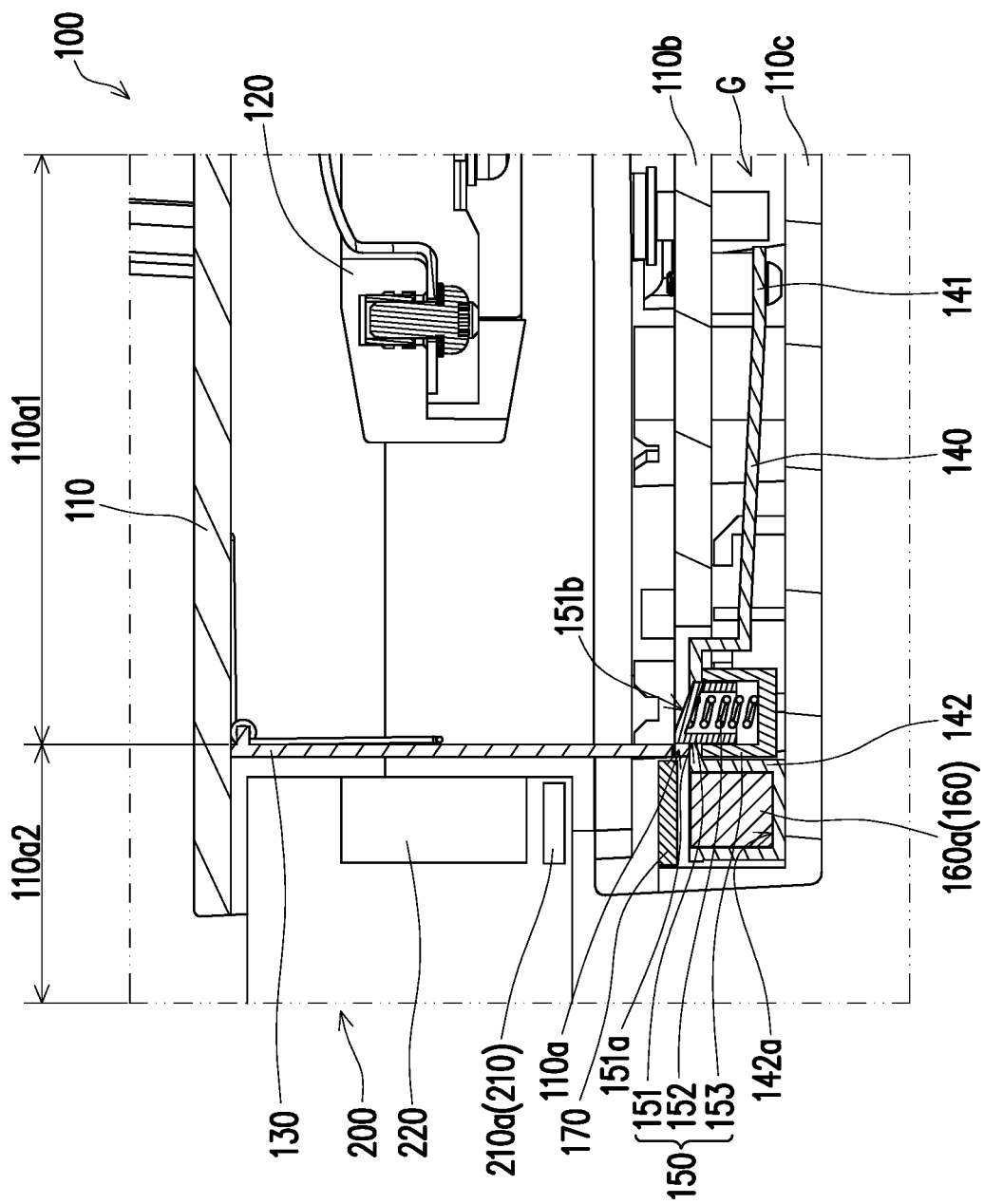
FIG. 3B is a schematic partial enlarged view illustrating that the automatic moving device approaches the opening of the charging device depicted in FIG. 1.

FIG. 3A is a schematic partial enlarged view illustrating that an automatic moving device has not yet approached an opening of the charging device depicted in FIG. 1. FIG. 3B is a schematic partial enlarged view illustrating that the automatic moving device approaches the opening of the charging device depicted in FIG. 1. FIG. 3A and FIG. 3B are schematic partial enlarged views of the base frame depicted in FIG. 2. Note that the charging part of the automatic moving device 200 is exclusively illustrated in in the embodiment, and other parts are omitted to facilitate the description.

With reference to FIG. 3A and FIG. 3B, in the embodiment, the charging device 100 includes a case 110, an electricity supply end 120, and a baffle 130. The case 110 has an opening 110a, and the case 110 is divided into an inner side 110a1 and an outer side 110a2 by the opening 110a as a boundary. The electricity supply end 120 is disposed in the case 110. The baffle 130 is pivotally connected to the case 110 to cover or expose the opening 110a. In the embodiment, the charging device 100 has a special design, which may prevent the baffle 130 from being pushed away by any object and inserted by foreign objects. Explanations will be provided hereinafter. Particularly, in the embodiment, the charging device 100 further includes an arm 140, a blocking assembly 150, and a follower 160 that are in the case 110.

As shown in FIG. 3A, in this embodiment, the arm 140 is located at one side of the baffle 130 opposite to the other side pivotally connected to the case 110 and has a fixed end 141 and a free end 142 opposite to each other. The fixed end 141 is fixed to the case 110 and located at the inner side 110a1 near the opening 110a, and the free end 142 extends from the fixed end 141 to the outer side 110a2.

To be specific, in the embodiment, the case 110 has an inner bottom wall 110b and an outer bottom wall 110c located at the bottom of the case 110, the inner bottom wall 110b is located above the outer bottom wall 110c, and there is a gap G between the inner bottom wall 110b and the outer bottom wall 110c. The fixed end 141 of the arm 140 is located at the gap G and connected to the inner bottom wall 110b.

In addition, the blocking assembly 150 is disposed at the arm 140, wherein the blocking assembly 150 is located at the inner side 110a1 near the opening 110a and is movably located on a rotating path of the baffle 130. As shown in FIG. 3A, the blocking assembly 150 is located at the inner side 110a1 of the baffle 130 to prevent the baffle 130 from flipping inward.

The case 110 provided in the embodiment further includes a position-limiting board 170 that covers the follower 160 and is located at the outer side 110a2. As shown in FIG. 3A, when the automatic moving device 200 has not yet approached the charging device 100, the baffle 130 is limited to be located between the blocking assembly 150 and the position-limiting board 170. Certainly, in other embodiments, the position-limiting board 170 may also be omitted.

Besides, the follower 160 is disposed at the free end 142 of the arm 140. In the embodiment, the arm 140 includes a groove 142a at the free end 142, and the follower 160 is in the groove 142; however, the configuration relationship between the follower 160 and the arm 140 is not limited in the disclosure.

The automatic moving device 200 has a driving part 210 and an electricity reception end 220. The driving part 210 of the automatic moving device 200 is configured to force the follower 160 of the charging device 100 to move away from the driving part 210 correspondingly, so that the free end 142 is shifted together with the follower 160, and that the blocking assembly 150 retracts from the rotating path of the baffle 130. Thereby, the electricity reception end 220 of the automatic moving device 200 may enter the opening 110a of the charging device 100 and dock with the electricity supply end 120.

In detail, according to the embodiment, the driving part 210 of the automatic moving device 200 includes a first magnetic member 210a, the follower 160 of the charging device 100 includes a second magnetic member 160a, and magnetic properties of the first magnetic member 210a and the second magnetic member 160a are the same.

Therefore, as shown in FIG. 3B, when the driving part 210 of the automatic moving device 200 approaches the opening 100a of the charging device 100, the follower 160 is adapted to be forced by magnetic repulsion of the driving part 210 to move away from the driving part 210 and drive the arm 140 to move in a downward manner, and the blocking assembly 150 disposed at the arm 140 moves away from the rotating path of the baffle 130. As such, the automatic moving device 200 may push away the baffle 130 to enter the case 110, so that the electricity reception end 220 docks with the electricity supply end 120.

Accordingly, in the embodiment, if an object to be inserted into the opening 110a is not equipped with any magnetic member that may cause the follower 160 to be magnetically repulsed and moved downward, it is unlikely for the blocking assembly 150 to move away from the rotating path of the baffle 130. As such, the baffle 130 may not be pushed inward, which effectively prevents entry of foreign objects.

In the embodiment, note that the blocking assembly 150 has a special design which may prevent the baffle 130 from returning to its position. In particular, the blocking assembly 150 includes a stopper 151, an elastic member 152, and a base 153. The base 153 is fixed to the arm 140. The stopper 151 is disposed in the base 153, and the elastic member 152 is connected between the stopper 151 and the base 153. The stopper 151 has a blocking surface 151a facing the opening 110a and an inclined surface 151b facing the electricity supply end 120.

When the automatic moving device 200 has not approached the charging device 100, the baffle 130 covers the opening 110a, and the blocking surface 151a faces the baffle 130. When the electricity reception end 220 of the automatic moving device 200 docks with the electricity supply end 120 of the charging device 100, the baffle 130 flips inward by 90 degrees and turns from a vertical state to a horizontal state.

When the automatic moving device 200 retracts from the opening 110a, the baffle 130 flips downward by gravity and returns from the horizontal state to the vertical state. In a process during which the baffle 130 returns to cover the opening 110a, the baffle 130 pushes against the inclined surface 151b of the stopper 151, which deforms the elastic member 152 and moves the stopper 151 downward until the stopper 151 moves away from the rotating path of the baffle 130, so as to avoid any impact on the process during which the baffle 130 returns to cover the opening 110a. After that, the baffle 130 returns to the position of covering the opening 110a, and the stopper 151 also returns to its position by the elastic member 152, so as to prevent the baffle 130 from being pushed inward again.

Other embodiments will be provided below for description. Note that the reference numbers and part of the content of the foregoing embodiments are applied in the following embodiments, the same reference numbers serve to represent the same or similar elements, and the description of the same technical content is omitted. Different features provided in each embodiment may be applicable in other embodiments in principle. The description of the omitted parts can be found in the previous embodiment and thus will not be repeated hereinafter.

Figure 4:
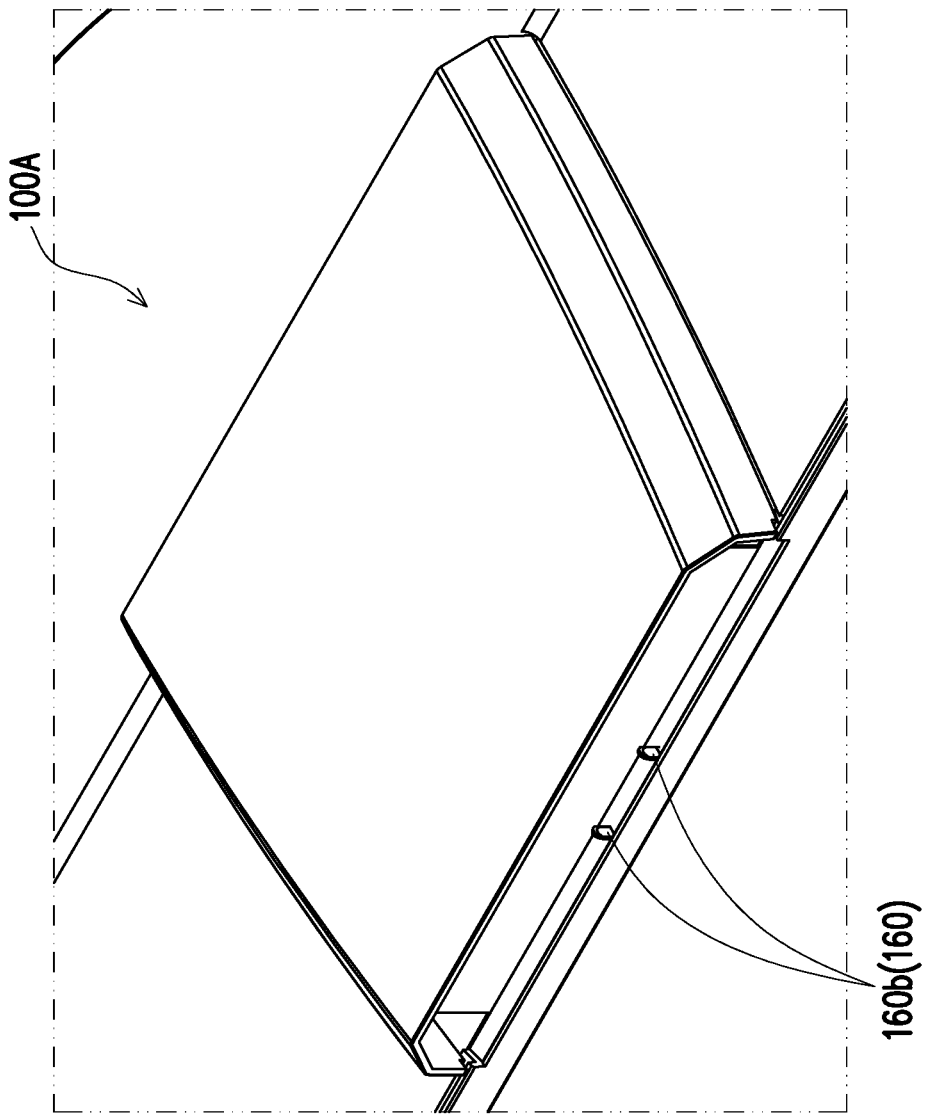
FIG. 4 is a schematic partially enlarged view of a charging device according to another embodiment of the disclosure.
Figure 5A:
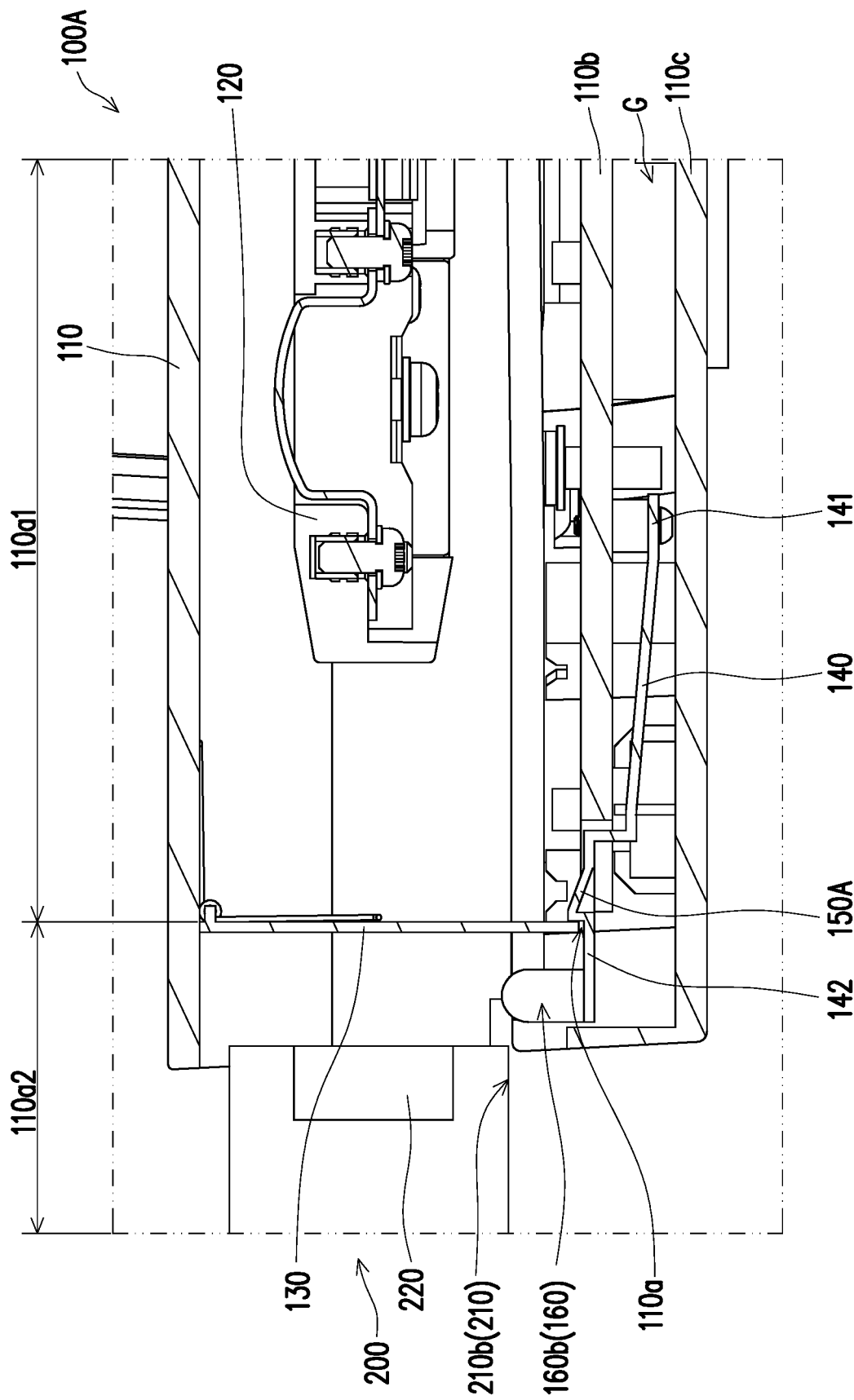
FIG. 5A is a schematic partial enlarged view illustrating that an automatic moving device has not yet approached an opening of the charging device depicted in FIG. 4.
Figure 5B:
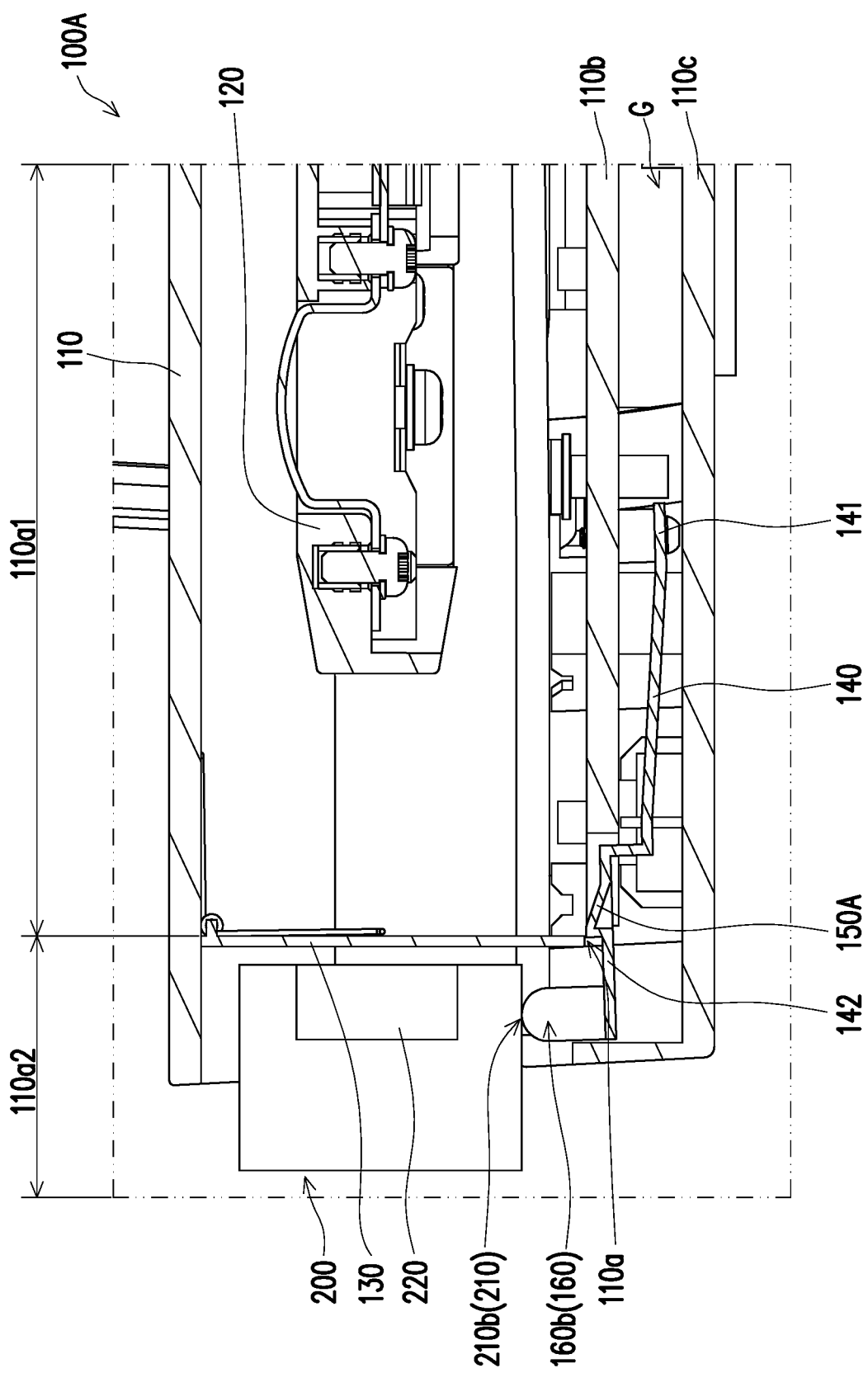
FIG. 5B is a schematic partial enlarged view illustrating that the automatic moving device approaches the opening of the charging device depicted in FIG. 4.

FIG. 4 is a schematic partially enlarged view of a charging device according to another embodiment of the disclosure. FIG. 5A is a schematic partial enlarged view illustrating that an automatic moving device has not yet approached an opening of the charging device depicted in FIG. 4. FIG. 5B is a schematic partial enlarged view illustrating that the automatic moving device approaches the opening of the charging device depicted in FIG. 4.

With reference to FIG. 4 to FIG. 5B, the main difference between the charging device 100A provide in the embodiment and the charging device 100 provide in the previous embodiment lies in that the follower 160 of the charging device 100A provided in the embodiment includes a bump 160b that is located at the outer side 110a2 and protrudes from the case 110. The driving part 210 of the automatic moving device 200 is a casing 210b.

In the embodiment, when the automatic moving device 200 has not approached the charging device 100A, the height of the bump 160b is greater than the height of a bottom of the baffle 130, so that the baffle 130 is limited to be located between the blocking assembly 150A and the bump 160b.

When the driving part 210 (the casing 210b) of the automatic moving device 200 approaches the opening 110a of the charging device 100A, the driving part 210 pushes against the follower 160, and the follower 160 is forced to move away from the driving part 210 and drive the blocking assembly 150A disposed at the arm 140 to move away from the rotating path of the baffle 130. The automatic moving device 200 is adapted to push away the baffle 130 to enter the case 110, and the electricity reception end 220 docks with the electricity supply end 120.

Therefore, if the driving part 210 does not press down on components of the follower 160 while approaching the opening 110a of the charging device 100A, the blocking assembly 150A does not move away from the rotating path of the baffle 130, and the baffle 130 is not retracted, so as to prevent entry of foreign objects.

In addition, another difference between the charging device 100A provided in the embodiment and the charging device 100 provided in the previous embodiment lies in that the blocking assembly 150A and the arm 140 are integrally formed according to the present embodiment. Specifically, the blocking assembly 150A is formed by bending a part of the arm 140. In the embodiment, the design of the shape of the blocking assembly 150A may also prevent the baffle 130 from flipping inward, and when the baffle 130 returns to cover the opening 110a, the blocking assembly 150A moves downward and away from the rotating path of the baffle 130, so that the baffle 130 may easily return to its position.

To sum up, the baffle of the charging device provided in one or more embodiments of the disclosure is pivotally connected to the case to protect the electricity supply end inside the case. Besides, the blocking assembly is disposed at the arm, wherein the blocking assembly is located at the inner side and is located on the rotating path of the baffle. The free end of the arm extends to the outer side, and the follower is disposed at the free end of the arm. Through the above configuration, the follower is adapted to be forced to move away from the driving part of the automatic moving device when the driving part approaches the opening of the charging device, so that the free end is shifted together with the follower and drives the blocking assembly located at the arm to move away from the rotating path of the baffle. The automatic moving device is adapted to push away the baffle to enter the case, so that the electricity reception end docks with the electricity supply end. Thereby, the charging device may be better protected, foreign objects may be prevented from entering the charging device, thus preventing damages to the internal structure.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure cover modifications and variations provided that they fall within the scope of the following claims and their equivalents.

What is claimed is:

1. A charging device adapted to charge an automatic moving device, wherein the automatic moving device comprises a driving part and an electricity reception end, and the charging device comprises:
   a case, having an opening and divided into an inner side and an outer side by the opening;
   an electricity supply end, disposed in the case;
   a baffle, pivotally connected to the case to cover or expose the opening;
   an arm, located at one side of the baffle opposite to the other side of the baffle pivotally connected to the case and having a fixed end and a free end opposite to each other, wherein the fixed end is fixed to the case and located at the inner side, and the free end extends from the fixed end to the outer side;
   a blocking assembly, disposed at the arm, wherein the blocking assembly is located at the inner side near the opening and is movably located on a rotating path of the baffle; and
   a follower, disposed at the free end of the arm and adapted to be forced to move away from the driving part when the driving part of the automatic moving device approaches the opening of the charging device, so that the free end is shifted together with the follower and drives the blocking assembly disposed at the arm to move away from the rotating path of the baffle, the automatic moving device is adapted to push away the baffle to enter the case, and the electricity reception end docks with the electricity supply end.

2. The charging device according to claim 1, wherein the driving part comprises a first magnetic member, the follower comprises a second magnetic member adapted to correspond to the first magnetic member, and magnetic properties of the first magnetic member and the second magnetic member are the same.

3. The charging device according to claim 2, wherein the arm comprises a groove at the free end, and the second magnetic member is in the groove.

4. The charging device according to claim 2, wherein the case comprises a position-limiting board covering the second magnetic member and located at the outer side, and when the automatic moving device has not yet approached the charging device, the baffle is limited to be located between the blocking assembly and the position-limiting board.

5. The charging device according to claim 1, wherein the follower comprises a bump located at the outer side and protruding from the case, the driving part of the automatic moving device is a casing, and when the driving part of the automatic moving device approaches the opening of the charging device, the driving part pushes against the follower, so that the follower is forced to move away from the driving part.

6. The charging device according to claim 5, wherein when the automatic moving device has not yet approached the charging device, a height of the bump is greater than a height of a bottom of the baffle, so that the baffle is limited to be located between the blocking assembly and the bump.

7. The charging device according to claim 1, wherein the blocking assembly comprises a stopper, and the stopper has a blocking surface facing the opening and an inclined surface facing the electricity supply end, when the automatic moving device has not yet approached the charging device, the baffle covers the opening, and the blocking surface faces the baffle, and when the automatic moving device exits from the opening, in a process during which the baffle returns to cover the opening, the baffle pushes against the inclined surface until the stopper leaves the rotating path of the baffle, so that the baffle returns to where the baffle covers the opening.

8. The charging device according to claim 7, wherein the blocking assembly further comprises an elastic member located at a bottom of the stopper, and when the baffle pushes against the inclined surface, the elastic member is deformed, so that the stopper moves away from the rotating path of the baffle.

9. The charging device according to claim 8, wherein the blocking assembly further comprises a base fixed to the arm, and the elastic member is located between the base and the stopper.

10. The charging device according to claim 7, wherein the blocking assembly and the arm are integrally formed.

* * * * *